Jan. 29, 1963 L. A. CARLTON ET AL 3,075,585
FLUID SAMPLER
Filed April 12, 1961 2 Sheets-Sheet 1

INVENTORS.
LOUIS A. CARLTON,
BELDON A. PETERS,
BY John B Davidson
ATTORNEY

Jan. 29, 1963

L. A. CARLTON ETAL 3,075,585

FLUID SAMPLER

Filed April 12, 1961

INVENTORS
LOUIS A. CARLTON,
BELDON A. PETERS,
BY
John B. Davidson
ATTORNEY.

United States Patent Office 3,075,585
Patented Jan. 29, 1963

3,075,585
FLUID SAMPLER
Louis A. Carlton and Beldon A. Peters, Houston, Tex.,
assignors to Jersey Production Research Company,
Tulsa, Okla., a corporation of Delaware
Filed Apr. 12, 1961, Ser. No. 102,524
2 Claims. (Cl. 166—164)

This invention relates to fluid samplers, and more particularly to apparatus for taking samples of fluids at remote locations such as in deep wells in the earth.

Various types of apparatus have been developed for obtaining samples of well fluids. Representative of such samplers are those described in U.S. Patent No. 2,927,641 and the references cited thereagainst. If the fluid samples are to be of maximum value in determining the characteristics of fluids in an earth formation, it is important that the fluid samples be obtained and maintained under earth formation conditions of pressure, concentration, etc. while being withdrawn up the borehole and while being transported to measuring and testing apparatus.

One of the more successful types of sampling apparatus that has been developed utilizes a thin diaphragm in a passageway connecting a sample chamber with the exterior of the sampler to isolate the sample chamber from the exterior of the sampler until the apparatus is at the location at which a sample is to be obtained. The diaphragm is punctured or shattered by a spring-biased spear so that fluids can flow into the chamber. To prevent fluids from flowing out of the chamber during retrieval of the apparatlus, a spring-biased check is inserted in the passageway. It is manifest that inclusion of the check valve in the instrument is undesirable inasmuch as the pressure of the fluid in the sample chamber must, of necessity, be less than reservoir pressure by an amount equal to the force exerted by the spring on the check valve.

In accordance with the teachings of the present invention, there is included in a passageway leading to a sample chamber from a fluid medium around the chamber a normally closed device such as a diaphragm that is adapted to be opened when the apparatus is in the fluid to be sampled, and a valve adapted to be held open by differential pressure into the chamber and to be held closed when the pressure in the chamber is higher than the pressure of the fluid medium around the chamber. Connected to the valve is an operating means adapted to hold the valve open at least until the fluid pressure in the sample chamber has equalized with the pressure of the fluid being sampled. Preferably, the operating means comprises a sealed chamber containing fluid under a substantialy lower pressure than the pressure of the fluid being sampled, and a rod connected to the movable member of the valve. The rod extends through the sealed chamber and at both ends thereof and is in fluid communication with the passageway. The rod changes in diameter within the sealed chamber and has means connected thereto within the chamber adapted to permit relatively unimpeded movement of the movable valve member away from the fixed valve member and to permit very slow movement of the movable valve member toward the fixed valve member. The rod and movable valve member are forced toward the fixed valve member by virtue of the fact that the differential force into the sealed chamber exerted on the end thereof away from the valve is greater than the differential force into the chamber exerted on the other end thereof because of the difference in area of the two ends.

Objects and features of the invention that are not apparent from the above discussion will become evident upon consideration of the following description thereof taken in connection with the accompanying drawings, wherein.

Figure 1:
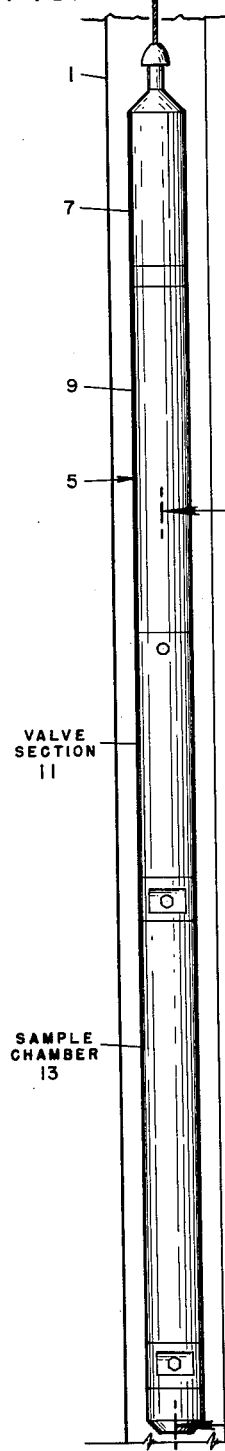
FIG. 1 is an elevational view of a fluid sampling instrument in accordance with the present invention in position in a well bore.

With reference now to FIG. 1, there is shown a subsurface fluid sampler 5 positioned within a well bore 1 at the end of a wire line 3 connected to the upper end of the sampler. The sampler housing comprises a plurality of sections designated by the reference numerals 7, 9, 11, and 13. The housing section 13 encloses a sample chamber and the housing section 11 encloses a valving arrangement to be described hereinafter, for controlling flow of well fluids into the sample chamber. The housing sections 7 and 9 are for apparatus for holding a valve-opening apparatus therein in a cocked position unti la predetermined time interval has elapsed or until the apparatus is at a given depth in a well.

Figure 2A:
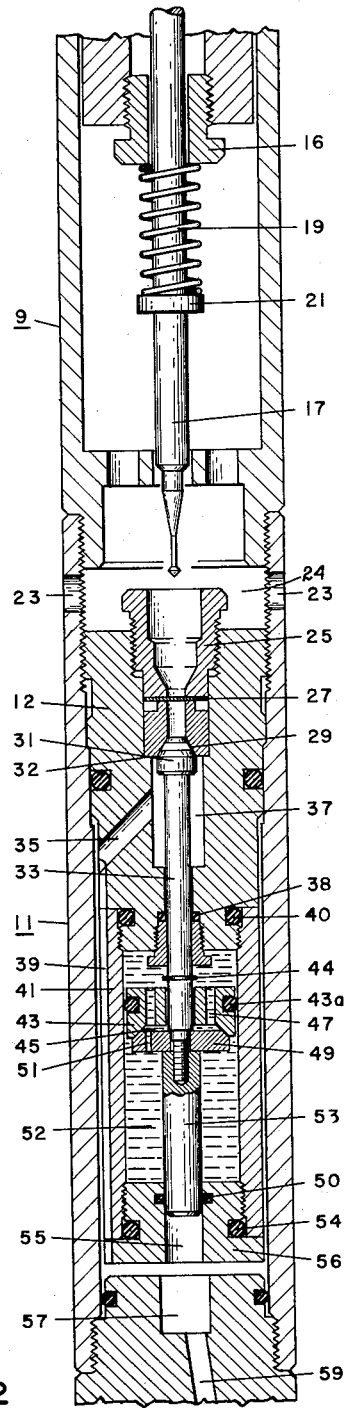
FIGS. 2A and 2B illustrate a cross-sectional view of the valve section and sample chamber section shown in FIG. 1, along with a portion of the remainder of the instrument.
Figure 2B:
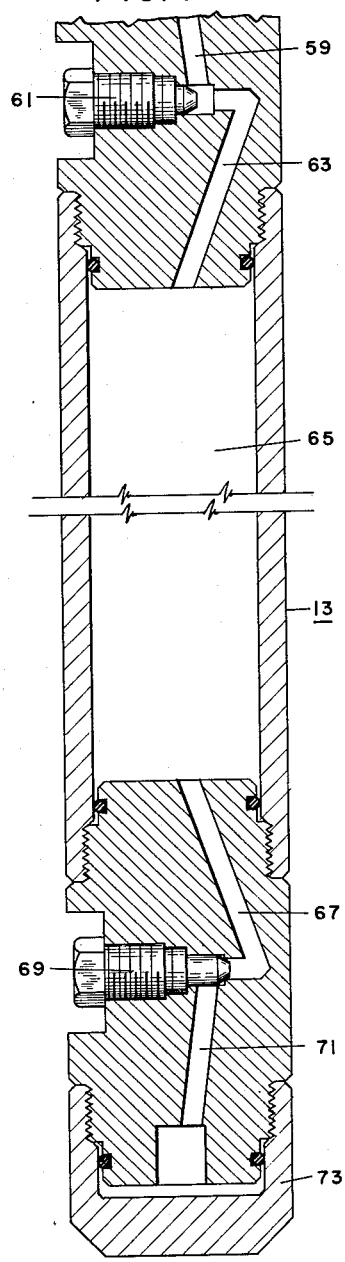

The details of construction of the apparatus are illustrated in FIGS. 2A and 2B. The sample chamber section 13 includes a sample chamber 65, bores 67 and 71 leading from the bottom of the sample chamber to the bottom of the apparatus, and an end cap 73 enclosing the lower end of passageway 71 so as to provide a fluid seal therefor. A needle valve 69 is provided between bores 67 and 71 to positively close off the bores and more effectively isolate the sample chamber 65.

Fluid flow into the sample chamber 65 from the exterior of the apparatus is through one or more port means 23 and thence through a passageway including the bores of holding nut 25 and valve seat 29, space 37, passages 35, 39 and 57, and bores 59 and 63. A needle valve member 61 is included between bores 59 and 63 to isolate the sample chamber 65 before and after a sample is taken.

A thin diaphragm, which may be of steel, is held against the upper end of valve seat 29 by holding nut 25. The diaphragm 27 is puncturable and preferably is frangible. The function of the diaphragm is to isolate the sample chamber 65 and valving apparatus hereinafter described during the time that the apparatus is being lowered into the well until it reaches the depth at which a sample is to be taken.

For the purpose of closing the passageway into the sample chamber after a sample has been taken, there is provided a valve seat 29 which is held against shoulder 32 by the holding nut 25. Valve piston 31 seats on the valve seat 29 to close the passageway. The valve piston 31 is adapted to reciprocate in space 37, and is affixed to a valve rod 33 which extends from the space 37 through chamber 52 into a bore 55. Bore 55 is in fluid communication with the passageway into sample chamber 65. The chamber 52 is formed by plugs 12 and 56 which are interconnected by an annular sleeve member 41. Preferably, the chamber is substantially cylindrical in shape and is hydraulically isolated from the passageway from port 23 into sample chamber 65 by seals 38, 40, 50, and 54, which may be O-rings. The seals 38 and 50 permit reciprocation of rod 33 and its extension 53 without losing the hydraulic seal between the passageway and the chamber 52. The extension 53 of rod 33 is of substantially larger diameter than the portion of the rod in space 37 for reasons that will become apparent below.

For the purpose of permitting relatively unimpeded movement of the valve rod 33 and valve piston 31 away from valve seat 29, and to permit only very slow movement of the valve piston 31 and valve rod 33 toward valve seat 29, an annular free piston 43 containing one or more large orifices 47 and an annular piston seat 49 containing one or more very small orifices 51 are affixed to the valve rod 33 within the chamber 52. Piston 43 includes a seal 43a, preferably an O-ring, in sliding sealing engagement with annular sleeve member 41. A stop ring or flange 44 is affixed to the valve rod 33 above the free piston 43 to limit relative movement of the piston up the rod 33. When the piston 43 seats on the tapered portion of the piston seat 49, a small space 45 exists therebetween, through which liquid may flow.

For the purpose of puncturing diaphragm 27 when the apparatus is at sampling depth in a well, there is provided a spear 17 which is adapted to be driven toward the diaphragm 27 to puncture the diaphragm. The driving force is obtained from a coil spring 19 which surrounds the spear and is positioned between an annular flange 21 on the spear and a guide nut 16 for the spear. Suitable holding and actuating apparatus for the spear adapted to release the spear after a predetermined time interval or at a predetermined depth in the well is described in the aforementioned U.S. Patent No. 2,927,641 and in U.S. patent application Serial No. 93,152 of H. M. Buck et al. filed March 3, 1961, and patent application Serial No. 89,401 of B. A. Peters et al. filed February 15, 1961.

Figure 3:
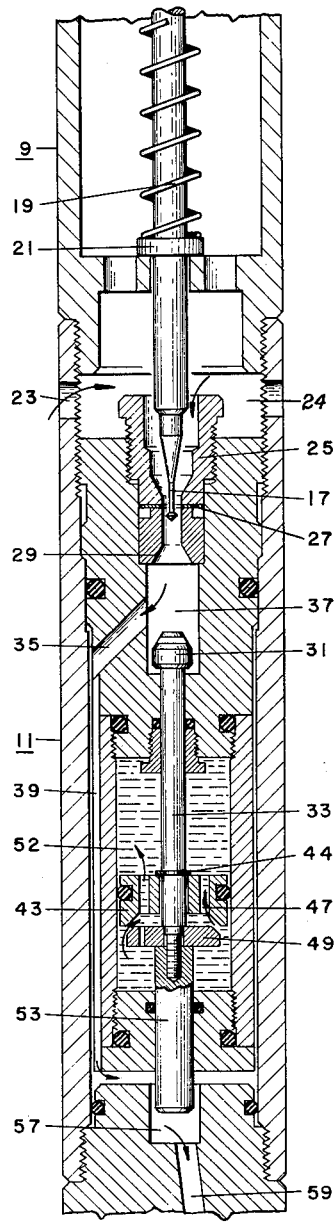
FIGS. 3 and 4 are views similar to FIG. 2A illustrating operating positions of the components of the valve section during a sampling operation.
Figure 4:
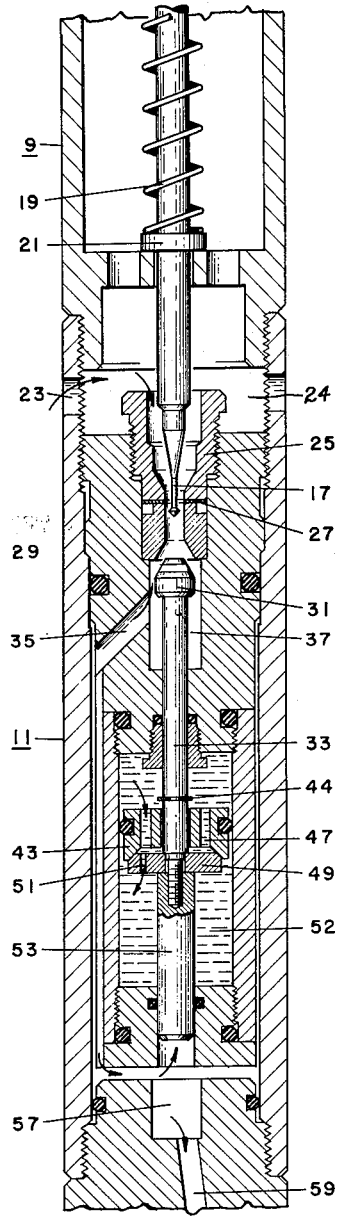

At the earth's surface before the apparatus is lowered into the well, needle valve 69 is closed and needle valve 61 is opened. Diaphragm 27 is inserted and holding nut 25 is tightened to hold the diaphragm 27 and valve seat 29 in place. The spear 17 is shoved upwardly as viewed, and the apparatus is cocked so as to release the spear at a predetermined depth or after a predetermined time interval. The apparatus is then lowered into the well with the component parts thereof in the relative positions shown in FIGS. 2A and 2B. When the spear is released, the diaphragm 27 will be punctured (see FIG. 3) and well fluids will rush through ports 23, space 24, and the bores of holding nut 25 and valve seat 29 so as to suddenly push valve piston 31 forcibly away from valve seat 29 to permit well fluid flow through passageway 35, channel 39, well 57, and bores 59 and 63. When the valve piston 31 is thus forced downwardly by the well fluids, the piston 43 will be forced against stop ring 44 so that the fluid in chamber 52 will flow between piston seat 49 and piston 43 and through large orifices 47 so that the movement of the piston 31 is virtually unimpeded by the free piston 43. As soon as the rate of flow of well fluids into the chamber 65 is reduced so that the pressure in space 37 and well 57 are substantially equalized, the force exerted on the lower end of rod extension 53 will be greater than the force exerted on the rod 33 in space 37. The reason for this is as follows. When the flow of well fluids into the sample chamber is small, the differential pressure between space 37 and chamber 52 is substantially the same as the differential pressure between bore 55 and chamber 52; the total force exerted on rod extension 53 is greater than the force exerted on rod 33 in space 37 because the cross-sectional area of rod extension 53 in bore 55 is greater than the cross-sectional area of rod 33 in space 37. Therefore, rod 33 will be forced upwardly as viewed. However, as illustrated in FIG. 4, piston 43 will immediately seat on piston seat 49 so that liquid in chamber 52 must flow through orifice 51. Inasmuch as the cross-sectional area of orifice 51 is small relative to the cross-sectional area of orifice 47, the rate of upward movement of piston 31 will be very small relative to the rate at which it was forced downwardly, and a substantial time interval will elapse before the piston seats on valve seat 29. This will provide sufficient time for the pressure in chamber 65 to equalize with the fluid pressure existing in the well bore around the instrument. As the result of the difference in cross-sectional area between rods 53 and 33, a force equal to the product of well pressure and the difference in rod cross-sectional areas acts to push valve piston 31 against seat 29 to insure a positive closure before the instrument is withdrawn from the well. When the apparatus is withdrawn from the well, the differential pressure holding piston 31 against valve seat 29 will gradually increase so that the pressure of the fluid in chamber 65 will be maintained constant. When the apparatus reaches the earth's surface, end cap 73 may be removed. The end of the instrument may be connected to a suitable pressure measuring device and valve 69 opened so that the fluid pressure in chamber 65 may be very accurately determined. This pressure manifestly will be the same as the pressure in the well at sampling depth.

The invention is not to be restricted to the specific structural details or arrangement of parts herein illustrated and described, as various modifications thereof may be effected without departing from the spirit and scope of this invention.

The objects and features of the invention having been completely described, what is claimed is:

1. A fluid sampler, comprising:
   a housing; a sample chamber in said housing;
   a passageway from said chamber to the exterior of said housing;
   first means in said housing adapted to close said passageway at least until said housing is at fluid sample taking location;
   means in said housing for opening said first means;
   a valve in said passageway comprising a fixed valve seat and a movable valve piston;
   a second fluid-tight cylindrical chamber;
   a piston rod connected to said valve piston and reciprocably extending through said second chamber into said passageway at both ends of said rod, said rod having a smaller diameter at the piston end of said second chamber than at the opposite end of said second chamber; and
   means affixed to said rod in said second chamber constructed and arranged to permit rod movement away from said valve seat with small opposition and toward said seat with substantially greater opposition.

2. A fluid sampler, comprising:
   a housing, a sample chamber in said housing;
   a passageway from said chamber to the exterior of said housing;
   first means in said housing adapted to close said passageway at least until said housing is at fluid sample taking location;
   means in said housing for opening said first means;
   a valve in said passageway comprising a fixed valve seat and a movable valve piston;
   a second fluid-tight cylindrical chamber;
   a piston rod connected to said valve piston and reciprocably extending through said second chamber into said passageway at both ends of said rod, said rod having a smaller diameter at the piston end of said second chamber than at the opposite end of said second chamber;
   an annular valve seat affixed to said rod in said second chamber so as to reciprocably move therewith in said second chamber;
   said annular valve seat being of substantially smaller diameter than said second chamber;
   an annular valve piston slidably affixed on said rod for limited longitudinal movement thereon, adapted to seat on said annular valve seat when said rod is moving toward said valve seat in said passageway, said annular valve piston further engaging the cylindrical walls of said second chamber in slidable sealing relationship therewith; and passageway means in said annular valve piston and said annular valve seat for permitting limited fluid flow therethrough upon movement thereof through said second chamber, the cross-sectional area of said passageway means in said annular valve piston being larger relative to the cross-sectional area of said passageway means in said annular valve seat.

References Cited in the file of this patent

UNITED STATES PATENTS

| | | |
|---|---|---|
| 1,591,511 | Cavins | July 6, 1926 |
| 2,147,983 | Lindsly | Feb. 21, 1939 |
| 2,316,216 | Bandy | Apr. 3, 1943 |
| 2,809,807 | Schneersohn et al. | Oct. 15, 1957 |